US009451606B2

(12) United States Patent
Zhao et al.

(10) Patent No.: US 9,451,606 B2
(45) Date of Patent: Sep. 20, 2016

(54) METHOD AND DEVICE FOR FEEDBACK INFORMATION TRANSMISSION BASED ON ENHANCED PHICH

(71) Applicant: China Academy of Telecommunications Technology, Beijing (CN)

(72) Inventors: Rui Zhao, Beijing (CN); Xueming Pan, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 50 days.

(21) Appl. No.: 14/364,296

(22) PCT Filed: Sep. 20, 2012

(86) PCT No.: PCT/CN2012/081698
§ 371 (c)(1),
(2) Date: Jun. 10, 2014

(87) PCT Pub. No.: WO2013/097497
PCT Pub. Date: Jul. 4, 2013

(65) Prior Publication Data
US 2015/0289234 A1    Oct. 8, 2015

(30) Foreign Application Priority Data

Dec. 29, 2011   (CN) .......................... 2011 1 0452537

(51) Int. Cl.
*H04W 72/04* (2009.01)
*H04L 1/18* (2006.01)
*H04L 5/00* (2006.01)
*H04L 27/26* (2006.01)
(Continued)

(52) U.S. Cl.
CPC .......... *H04W 72/042* (2013.01); *H04L 1/0073* (2013.01); *H04L 1/1812* (2013.01); *H04L1/1861* (2013.01); *H04L 5/0053* (2013.01); *H04L 5/0055* (2013.01); *H04L 27/2601* (2013.01); *H04W 72/0453* (2013.01); *H04W 88/08* (2013.01)

(58) Field of Classification Search
CPC .......... H04W 72/042; H04W 72/0453; H04L 27/2601; H04L 1/1812; H04L 5/0053; H04L 5/0055
See application file for complete search history.

(56) References Cited

U.S. PATENT DOCUMENTS

| 2009/0055703 A1* | 2/2009 | Kim ...................... H04L 1/1816 714/748 |
| 2011/0235534 A1* | 9/2011 | Ratasuk ................ H04L 1/0073 370/252 |
| 2012/0026935 A1* | 2/2012 | Park ...................... H04L 1/1854 370/315 |

FOREIGN PATENT DOCUMENTS

| CA | 2780390 A1 | 5/2011 |
| CN | 101272232 A | 9/2008 |

(Continued)

OTHER PUBLICATIONS

International Search Report for PCT/CN2012/081698.
(Continued)

*Primary Examiner* — Mohammad Anwar
(74) *Attorney, Agent, or Firm* — Kilpatrick Townsend & Stockton LLP

(57) ABSTRACT

The present invention relates to the field of communications. Disclosed are a method and a device for feedback information transmission based on an enhanced PHICH. The method comprises transmitting ACK/NACK feedback information to a terminal through E-PHICH sources configured in a PDSCH area; therefore, on one hand, the problem that the PHICH cannot be transmitted in some scenarios, such as an ABS sub-frame of eICIC and a subsequent possibly-defined extended carrier, is solved; and on the other hand, the signaling overhead can be saved, so that the utilization rate of resources is improved, for example, the scheduling of retransmission of a PUSCH is prevented from being carried out by a system though a DCI format 0, therefore, the effects of improving the capacity of the PHICH and solving the problem of legacy PHICH resource contention are achieved.

8 Claims, 13 Drawing Sheets

(51) Int. Cl.
*H04L 1/00* (2006.01)
*H04W 88/08* (2009.01)

(56) References Cited

FOREIGN PATENT DOCUMENTS

| CN | 101527623 A | 9/2009 |
| CN | 102076094 A | 5/2011 |
| CN | 102202400 A | 9/2011 |
| CN | 102546134 A | 7/2012 |

OTHER PUBLICATIONS

Extended European Search Report issued on Jun. 29, 2015 in the EP counterpart application (12862529.0).

* cited by examiner

METHOD AND DEVICE FOR FEEDBACK INFORMATION TRANSMISSION BASED ON ENHANCED PHICH

This application is a US National Stage of International Application No. PCT/CN2012/081698, filed 20 Sep. 2012, designating the United States, and claiming priority to Chinese Patent Application No. 201110452537.8, filed with the State Intellectual Property Office of China on Dec. 29, 2011 and entitled "Method and device for feedback information transmission based on enhanced PHICH", which is hereby incorporated by reference in its entirety.

FIELD OF THE INVENTION

The present invention relates to the field of communication and particularly to a method and a device for feedback information transmission based on an enhanced PHICH.

BACKGROUND OF THE INVENTION

At present a Physical Hybrid Automatic Repeat Request (HARQ) Indicator Channel (PHICH) in a Long Term Evolution (LTE) Release 10 (Rel-10) system is relevantly defined as follows:

A PHICH is configured to carry Acknowledgement/Non-Acknowledgement (ACK/NACK) feedback information of an uplink service. A resource location of the PHICH is typically indicated by a parameter pair ($n_{PHICH}^{group}$, $n_{PHICH}^{seq}$) wherein $n_{PHICH}^{group}$ represents the serial number of a PHICH group, and $n_{PHICH}^{seq}$ represents the index of an orthogonal sequence.

The PHICH group conceptually refers to a set of Resource Elements (REs) in which 8 PHICHs can be transmitted and the PHICHs are respectively distinguished from each other by orthogonal sequences. There are 8 orthogonal sequences in case of normal Cyclic Prefix (CP), and then there are 8 PHICHs in one PHICH group; and there are 4 orthogonal sequences in case of extended Cyclic Prefix (CP), and then there are 4 PHICHs in one PHICH group.

Typically the number of PHICH groups in the LTE Rel-10 system can be determined as follows:

In a Frequency Division Duplexing (FDD) system, the number of PHICH groups is fixed in all of sub-frames and determined by Formula 1 below:

$$N_{PHICH}^{group} = \begin{cases} \lceil N_g(N_{RB}^{DL}/8) \rceil & \text{for normal cyclic prefix} \\ 2*\lceil N_g(N_{RB}^{DL}/8) \rceil & \text{for extended cyclic prefix} \end{cases} \quad \text{Formula 1}$$

Wherein $N_{PHICH}^{group}$ represents the total number of PHICH groups, $N_g \in \{1/6, 1/2, 1, 2\}$ is configured by a high layer, $N_{RB}^{DL}$ represents a system bandwidth, and the serial number of the index $n_{PHICH}^{group}$ ranges from 0 to $N_{PHICH}^{group}-1$.

In a Time Division Duplexing (TDD) system, the number of PHICH groups may vary in respective downlink sub-frames and be given by $m_i \cdot n_{PHICH}^{group}$, wherein $m_i$ is determined by configuration information as depicted in Table 1, $n_{PHICH}^{group}$ is calculated by the above Formula 1, and the serial number of the index $n_{PHICH}^{group}$ ranges from 0 to $m_i \cdot N_{PHICH}^{group}-1$.

TABLE 1

(A definition of factor $m_i$)

| Uplink-downlink configuration | Sub-frame number i | | | | | | | | |
|---|---|---|---|---|---|---|---|---|---|
| | 0 | 1 | 2 | 3 | 4 | 5 | 6 | 7 | 8 |
| 0 | 2 | 1 | — | — | — | 2 | 1 | — | — |
| 1 | 0 | 1 | — | — | 1 | 0 | 1 | — | — |
| 2 | 0 | 0 | — | 1 | 0 | 0 | 0 | — | 1 |
| 3 | 1 | 0 | — | — | — | 0 | 0 | 0 | 1 |
| 4 | 0 | 0 | — | — | 0 | 0 | 0 | 0 | 1 |
| 5 | 0 | 0 | — | 0 | 0 | 0 | 0 | 0 | 1 |
| 6 | 1 | 1 | — | — | — | 1 | 1 | — | — |

Typically network side maps PHICHs onto Resource Element Group (REG) in a control region where Physical Downlink Control Channel (PDCCH) is located, and the REG is unused by Physical Control Format Indicator Channel (PCFICH) and Cell-Specific Reference Signal (CRS), a duration time of the mapping in time domain can be configured and broadcast by the system. Referring to FIG. 1, in a case of a normal PHICH time domain resource configuration (i.e., a Normal PHICH Duration), PHICHs are mapped onto a first Orthogonal Frequency Division Multiplexing (OFDM) symbol of a downlink sub-frame to support a scenario with a smaller number of users and a small coverage; while in a case of an extended PHICH time domain resource configuration, each PHICH group can be mapped onto the first 3 OFDM symbols of a downlink sub-frame; and in an especial case, each PHICH group can be mapped onto the first 2 OFDM symbols in a Multimedia Broadcast multicast service Single Frequency Network (MBSFN) sub-frame and TD-SCDMA Long Term Evolution (TD-LTE) sub-frames 1 and 6 to support a scenario with a larger coverage radius or a larger number of users. Furthermore, the number of PHICH groups in a cell can also be configured at 4 different levels (i.e., $N_g \in \{1/6, 1/2, 1, 2\}$), and the configuration situations are broadcast by the system to support various user capacities.

3 REGs occupied in the control region by one PHICH group are distributed differently in time and frequency domains for the purpose of maximizing time and frequency diversity gains. As illustrated in FIG. 1, FIG. 1 illustrates a schematic diagram of mapping resources of one PHICH group and shows that time-frequency resources occupied by one PHICH group are related to the number of REGs, a cell ID, the serial number of the PHICH group, specific serial numbers of OFDM symbols, etc.

Correspondingly, for a User Equipment (UE), when the UE transmits uplink data based on Physical Uplink Shared Channel (PUSCH), ACK/NACK feedback information corresponding to the uplink data is transmitted by the network side to the UE based on a PHICH in a downlink sub-frame, wherein considering a PUSCH transmitted in a sub-frame n, the UE receives a corresponding PHICH in a sub-frame $n+k_{PHICH}$, and for a FDD system, $k_{PHICH}=4$, and for the TDD system, $k_{PHICH}$ is determined through configuration information depicted in Table 2:

TABLE 2

(A $k_{PHICH}$ configuration of a TDD system)

| TDD UL/DL Configuration | UL sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | | 6 | 6 | 6 | | | | |
| 4 | | | | 6 | 6 | | | | | |
| 5 | | | | 6 | | | | | | |
| 6 | | | 4 | 6 | 6 | | | 4 | 7 | |

A specific location of a time-frequency resource occupied in a downlink sub-frame by a PHICH is decided jointly by a lowest PRB serial number among PUSCH resources indicated by scheduling signaling carried in Downlink Control Information (DCI) transmitted in the format 0 on PDCCH and a De-Modulation Reference Signal (DMRS) indicated by 3 bits.

A specific location of a time-frequency resource occupied by a PHICH is identified by a pair of parameters ($n_{PHICH}^{group}$, $n_{PHICH}^{seq}$) wherein $n_{PHICH}^{group}$ represents the serial number of a PHICH group; and $n_{PHICH}^{seq}$ represents the serial number of an orthogonal sequence in the PHICH group, particularly calculated by Formula 2:

$$n_{PHICH}^{group} = (I_{PRB\_RA} + n_{DMRS}) \bmod n_{PHICH}^{group} + I_{PHICH} n_{PHICH}^{group}$$

$$n_{PHICH}^{seq} = (\lfloor I_{PRB\_RA} / n_{PHICH}^{group} \rfloor + n_{DMRS}) \bmod 2N_{SF}^{PHICH} \quad \text{Formula 2}$$

Wherein $n_{DMRS}$ represents the value of a cyclic shift of a DMRS used in PUSCH corresponding to a PHICH and indicated by cyclic shift information in a DMRS field in the DCI format 0 (i.e., DCI in the format 0), and the specific mapping relationship is illustrated in Table 3.

TABLE 3

(Mapping relationship between $n_{DMRS}$ and a cyclic shift for a DMRS field in the DCI format 0)

| Cyclic Shift for DMRS Field in DCI format 0 in [4] | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

Referring to a PUSCH transmitted in a sub-frame n, if there is no corresponding uplink scheduling instruction in the DCI format 0 or transmission of the PUSCH is scheduled by a random access response, $n_{DMRS}$ is set to 0;

$N_{SF}^{PHICH}$ represents the size of a spreading factor for modulation of a PHICH defined in the standard 36.221;

$$I_{PRB\_RA} = \begin{cases} I_{PRB\_RA}^{lowest\_index} & \begin{array}{l}\text{in a case that a } PDCCH \text{ indicates to schedule} \\ \text{a first transmission block in a } PUSCH, \text{ or there} \\ \text{is no corresponding } PDCCH \text{ and the number of} \\ \text{received } NACKs \text{ is unequal to the number of} \\ \text{transmission blocks in a } PUSCH \text{ recently scheduled} \\ \text{by a } PDCCH \end{array} \\ I_{PRB\_RA}^{lowest\_index} + 1 & \begin{array}{l}\text{in a case that a } PDCCH \text{ indicates to schedule} \\ \text{a second transmission block in a } PUSCH \end{array} \end{cases}$$

$I_{PRB\_RA}^{lowest\_index}$ represents a lowest PRB serial number allocated by a first timeslot in transmission of a corresponding PUSCH;

$n_{PHICH}^{group}$ represents the number of PHICH groups, configured by high-layer signaling; and $$I_{PHICH} = \begin{cases} 1 & \begin{array}{l}\text{when } TDD \text{ } UL/DL \text{ is configured to be 0, and} \\ \text{a } PUSCH \text{ is in a sub-frame of } n = 4 \text{ or } n = 9\end{array} \\ 0 & \text{under other conditions} \end{cases}$$

The foregoing relevant definition of a PHICH is currently applicable only to the LTE-Rel-10 system. A traditional method of providing an access with use of the single-layer coverage by a macro base station has failed to satisfy a user demand along with an increasingly growing data rate and demand for service load. Thus it is typical at present to address the foregoing issue by a hierarchical coverage, for example, some low-power base stations, e.g., a Home eNodeB/a pico base station/a femto base station/a relay base station, etc., are deployed in a hotspot area or indoors. Such a low-power base station is a base station device applied in a home indoor environment, an office environment or other hotspot small-coverage environment to enable an operator to provide an appealing service at a higher data rate and a lower cost. However the femto base station limits the accessing member users to a certain degree and is inaccessible to a non-member user, and if the non-member user enters the coverage area of the base station, then it may enter a coverage hole due to a stronger signal of the low-power base station and consequentially cannot operate. Moreover the pico base station at the same frequency as the macro base station may also generate strong interference and consequentially cannot operate. In order to address such interference, an existing practice is to set an Almost Blank Sub-frame (ABS), so that the base station transmits signals less frequently in the ABS so as to reduce interference to an adjacent cell, to perform Inter-Cell Interference Coordination (ICIC) through Time Division Multiple (TDM).

However in the existing TDM ICIC mechanism, the interfering base station configured with the ABS will not transmit any control information in the ABS in order to avoid interferences, so transmission of a PHICH in the control region may be limited due to the introduced ABS mechanism.

On the other hand, the definition of an extended carrier may be introduced to the LTE Rel-11 system, that is, a PDCCH control region supported in the LTE Rel-10 system is not included in an extended carrier, but a PUSCH can be scheduled in an extended carrier, and thus other compatible component carriers are scheduled through cross-carrier scheduling on one hand, and transmission of an enhanced PDCCH can be newly defined over an extended carrier on the other hand, wherein a PDSCH transmission region is occupied for transmission of an enhanced PDCCH. Thus limited transmission of a PHICH in the control region may also arise in the latter case.

In the prior art, a method to address the issue of limited transmission of a PHICH is to adopt scheduling signaling in the DCI format 0 for the system instead of a PHICH to notify the UE whether to retransmit a PUSCH, but this method may result in an extra overhead of system signaling and a consequential increase in operation load of the system, thus degrading the performance of the system.

SUMMARY OF THE INVENTION

Embodiments of the present invention provide a method and a device for feedback information transmission based on enhanced PHICH so as to address the issue of limited transmission of PHICHs without any increase in the overhead of system signaling.

Specific technical solutions provided by the embodiments of the present invention are as follows:

A method for feedback information transmission based on an enhanced PHICH, which includes:

determining time-frequency resources occupied by the enhanced PHICH configured in a PDSCH region by a network side;

notifying a user equipment of the determined time-frequency resources occupied by the enhanced PHICH;

determining groups of enhanced PHICH resources for carrying ACK/NACK feedback information among the time-frequency resources occupied by the enhanced PHICH according to a scheduling condition of the user equipment; and mapping the ACK/NACK feedback information to be transmitted onto the groups of enhanced PHICH resources and transmitting the ACK/NACK feedback information to the user equipment.

A method for feedback information transmission based on an enhanced PHICH, which includes:

determining time-frequency resources occupied by the enhanced PHICH configured in a PDSCH region by a network side based on a notification of a base station;

determining groups of enhanced PHICH resources for carrying ACK/NACK feedback information among the time-frequency resources occupied by the enhanced PHICH according to scheduling signaling of the base station; and receiving the ACK/NACK feedback information transmitted from the base station based on the determined groups of enhanced PHICH resources.

A device for feedback information transmission based on an enhanced PHICH, which includes:

a first processing component configured to determine time-frequency resources occupied by the enhanced PHICH configured in a Physical Downlink Shared Channel (PDSCH) region by a network side and to notify a user equipment of the determined time-frequency resources occupied by the enhanced PHICH;

a second processing component configured to determine groups of enhanced PHICH resources for carrying ACK/NACK feedback information among the time-frequency resources occupied by the enhanced PHICH according to a scheduling condition of the user equipment; and a communication component configured to map the ACK/NACK feedback information to be transmitted onto the groups of enhanced PHICH resources and to transmit the ACK/NACK feedback information to the user equipment.

A device for feedback information transmission based on an enhanced PHICH, which includes:

a first control component configured to determine time-frequency resources occupied by the enhanced PHICH configured in a Physical Downlink Shared Channel (PDSCH) region by a network side based on a notification of a base station;

a second control component configured to determine groups of enhanced PHICH resources for carrying ACK/NACK feedback information among the time-frequency resources occupied by the enhanced PHICH according to scheduling signaling of the base station; and a communication component configured to receive the ACK/NACK feedback information transmitted from the base station based on the determined groups of enhanced PHICH resources.

In the embodiments of the present invention, a novel method for E-PHICH transmission based upon FDM is proposed, that is, ACK/NACK feedback information is carried over E-PHICH resources configured in a PDSCH region, so that on one hand, the issue of unavailable transmission of PHICHs in some scenarios, e.g., in an ABS sub-frame of eICIC and an extended carrier to be possibly defined subsequently, can be addressed; and on the other hand, the overhead of signaling can be saved and the utilization ratio of resources can be improved, for example, retransmission of a PUSCH scheduled by the system in the DCI format 0 is avoided, to achieve the effects of improving a capacity of PHICHs and addressing a legacy PHICH resource confliction.

DETAILED DESCRIPTION OF THE EMBODIMENTS

In order to address the issue of limited transmission of PHICHs without any increase in overhead of system signaling, in an embodiment of the present invention, a transmission region of PHICHs is transferred from a legacy Physical Downlink Control Channel (PDCCH) region (also referred to as a control region) to a Physical Downlink Shared Channel (PDSCH) region, and ACK/NACK feedback information is transmitted based on enhanced PHICH resources (denoted as E-PHICH) configured in the PDSCH region.

Figure 1:
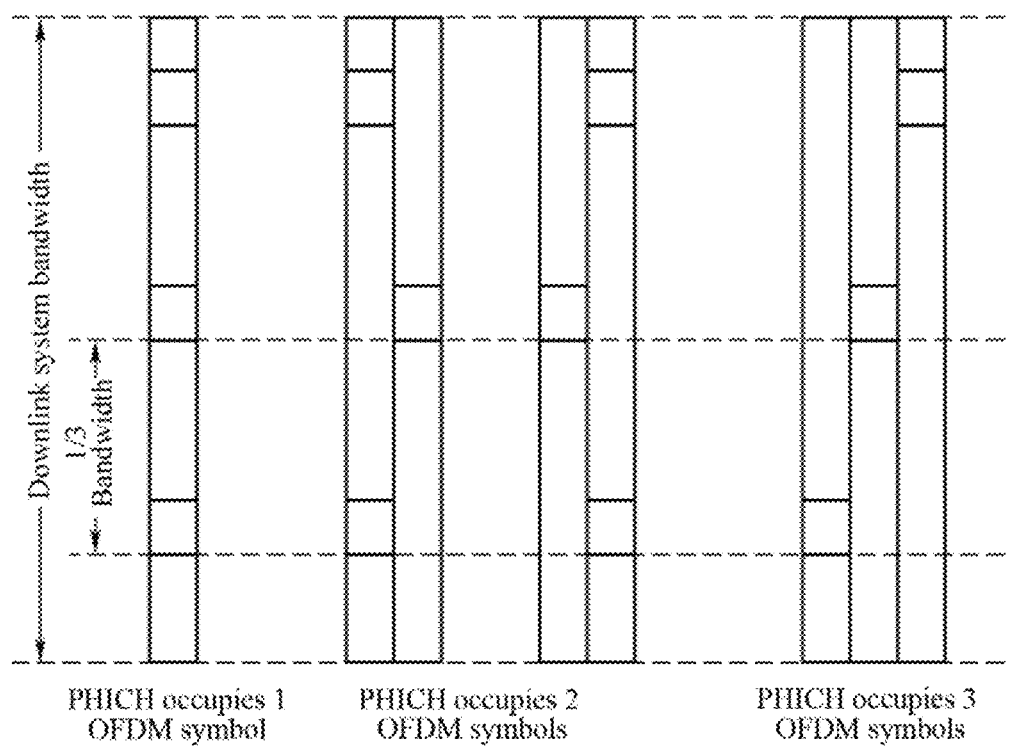
FIG. 1 is a schematic diagram of resources occupied in a legacy PDCCH region by PHICHs in the prior art.
Figure 2A:
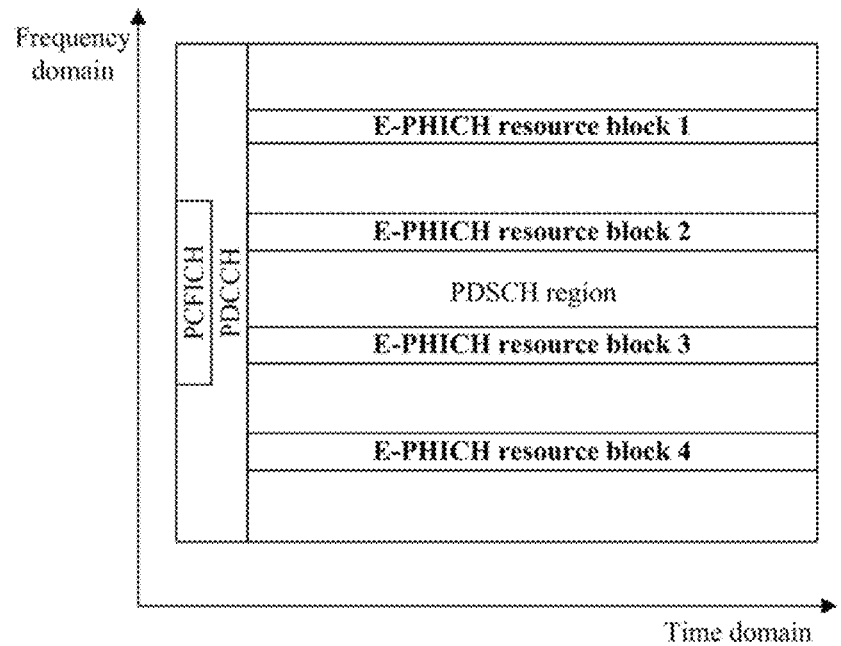
FIG. 2A and FIG. 2B are schematic diagrams of E-PHICH transmission method according to embodiments of the invention.
Figure 2B:
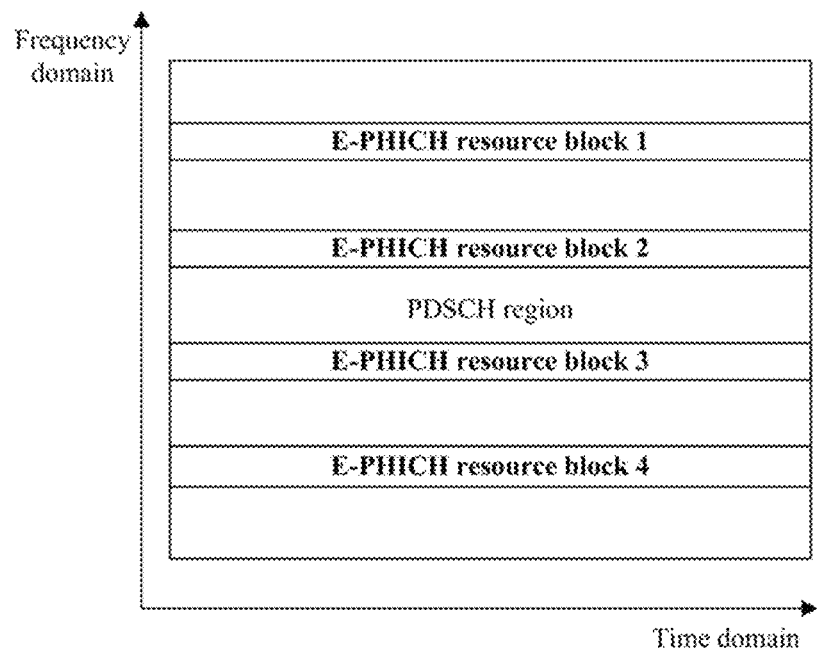

Referring to FIG. 2A and FIG. 2B, for example, a system can transmit ACK/NACK feedback information through E-PHICH resource blocks configured in a PDSCH region over compatible carriers and only transmit PCFICH in the PDCCH region; or the system can transmit ACK/NACK feedback information through E-PHICH resource blocks configured in a PDSCH region over extended carriers.

ACK/NACK feedback information can be transmitted based on E-PHICH resources through multiplexed transmission including one or any combination of Time Division Multiplexing (TDM). Frequency Division Multiplexing (FDM) and Code Division Multiplexing (CDM).

Preferred embodiments of the present invention will be detailed below with reference to the drawings.

Figure 3:
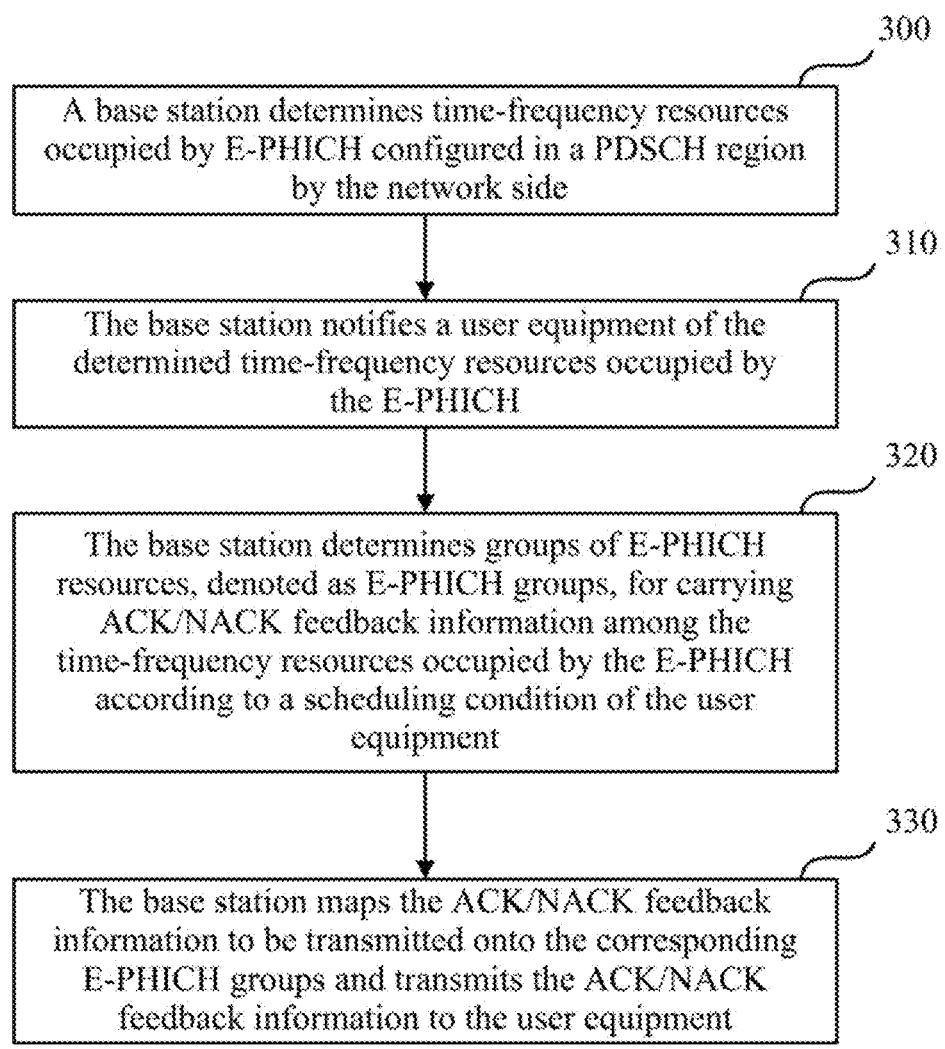
FIG. 3 is a flow chart of a base station transmitting ACK/NACK feedback information based on E-PHICH according to an embodiment of the invention.

Referring to FIG. 3, a detailed flow in which a base station transmits ACK/NACK feedback information based on E-PHICH according to an embodiment of the present invention is as follows:

Step 300: A base station determines time-frequency resources occupied by E-PHICH configured in a PDSCH region by the network side.

The time-frequency resources occupied by the E-PHICH may be some combinations of transmission resources discontinuous in time domain or/and frequency domain. Referring to FIG. 2A and FIG. 2B, for example, the time-frequency resources occupied by the E-PHICH are an E-PHICH resource block 1, an E-PHICH resource block 2, an E-PHICH resource block 3 and an E-PHICH resource block 4 in the PDSCH region, where the size of each E-PHICH resource block may be one sub-carrier or a combination of a plurality of continuous sub-carriers or a plurality of PRB pairs or a combination of a plurality of REs.

Step 301: The base station notifies a user equipment of the determined time-frequency resources occupied by the E-PHICH.

The step 310 may be performed in the following two implementations but will not be limited thereto:

In a first implementation, the user equipment is notified of the determined time-frequency resources occupied by the E-PHICH via dedicated signaling.

For example, the user equipment is notified of specific locations of PRB pairs occupied by the E-PHICH via Radio Resource Control (RRC) signaling or a system broadcast message.

In another example, the user equipment is notified of a starting location of PRB pairs occupied by the E-PHICH and the number of occupied PRB pairs via RRC signaling or a broadcast message, wherein the PRB pairs occupied by the E-PHICH are distributed uniformly throughout a downlink system bandwidth as a plurality of resource blocks, particularly as follows:

1. The user equipment is directly notified of the a starting location of the PRB pairs occupied by the E-PHICH and the number of occupied PRB pairs via RRC signaling or a system broadcast message.

2. The user equipment is notified of the starting location of the PRB pairs occupied by the E-PHICH, and the use equipment is instructed to determine the number of PRB pairs occupied by the E-PHICH as agreed on with the network side, via RRC signaling or a system broadcast message, wherein an association relationship between the number of PRB pairs occupied by the E-PHICH and the downlink system bandwidth may be agreed on.

3. The user equipment is instructed to calculate the starting location of the PRB pairs occupied by the E-PHICH based on a cell identifier (ID) and a system bandwidth, and to determine an agreed-on association relationship between the number of PRB pairs occupied by the E-PHICH and the downlink system bandwidth as agreed on with the network side, via RRC signaling or a system broadcast message.

In a second implementation, the user equipment is notified of an E-PHICH resource configuration parameter via RRC signaling or a system broadcast message so that the user equipment occupies a part of time-frequency resources in E-PDCCH (enhanced PDCCH) (i.e., PRB pairs) according to the E-PHICH resource configuration parameter.

Figure 4A:
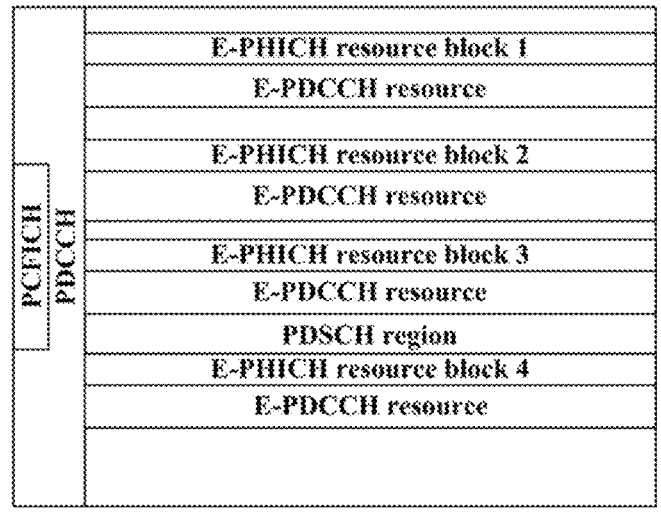
FIG. 4A and FIG. 4B are schematic diagrams of E-PHICH resource occupying methods according to embodiments of the invention.
Figure 4B:
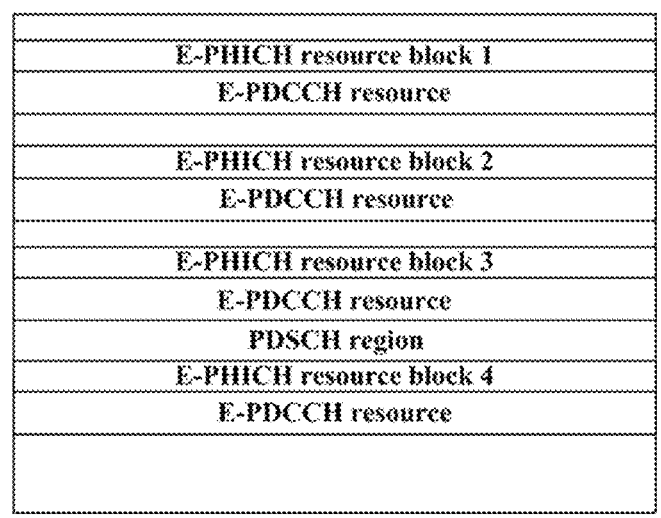

Referring to FIG. 4A and FIG. 4B, in a practical application, the E-PDCCH may be transmitted by occupying the time-frequency resources in the PDSCH region, and the E-PHICH may use a part of the time-frequency resources occupied by the E-PDCCH, wherein typically the network side firstly calculates the resources reserved for the E-PHICH, and the remaining time-frequency resources may be used for the transmission of the E-PDCCH.

In this embodiment, when the E-PHICH uses a part of the time-frequency resources occupied by the E-PDCCH, the time-frequency resources used by the E-PHICH can still be reserved in a similar reservation way as the PHICH resources in the Rel-10, that is, the size of the time-frequency resources reserved for the E-PHICH (including specific locations of PRB pairs, or a starting location and the number of PRB pairs) is determined by an E-PHICH resource configuration related parameter (e.g., a PHICH configuration parameter Ng in the Rel-10), possibly still as done in the Rel-10, wherein the user equipment may be notified of the E-PHICH resource configuration related parameter via RRC signaling or a system broadcast message.

Step 320: The base station determines groups of E-PHICH resources, denoted as E-PHICH groups, for carrying ACK/NACK feedback information among the time-frequency resources occupied by the E-PHICH according to a scheduling condition of the user equipment.

In the step 320, the base station may determine E-PHICH resources for carrying the ACK/NACK feedback information among the time-frequency resources occupied by the E-PHICH according to a lowest PRB pair serial number and a cyclic shift of an uplink DMRS indicated in a PUSCH transmission grant, and reference can be made to the Rel-10 for relative operations thereof, so a repeated description thereof will be omitted here.

Figure 5:
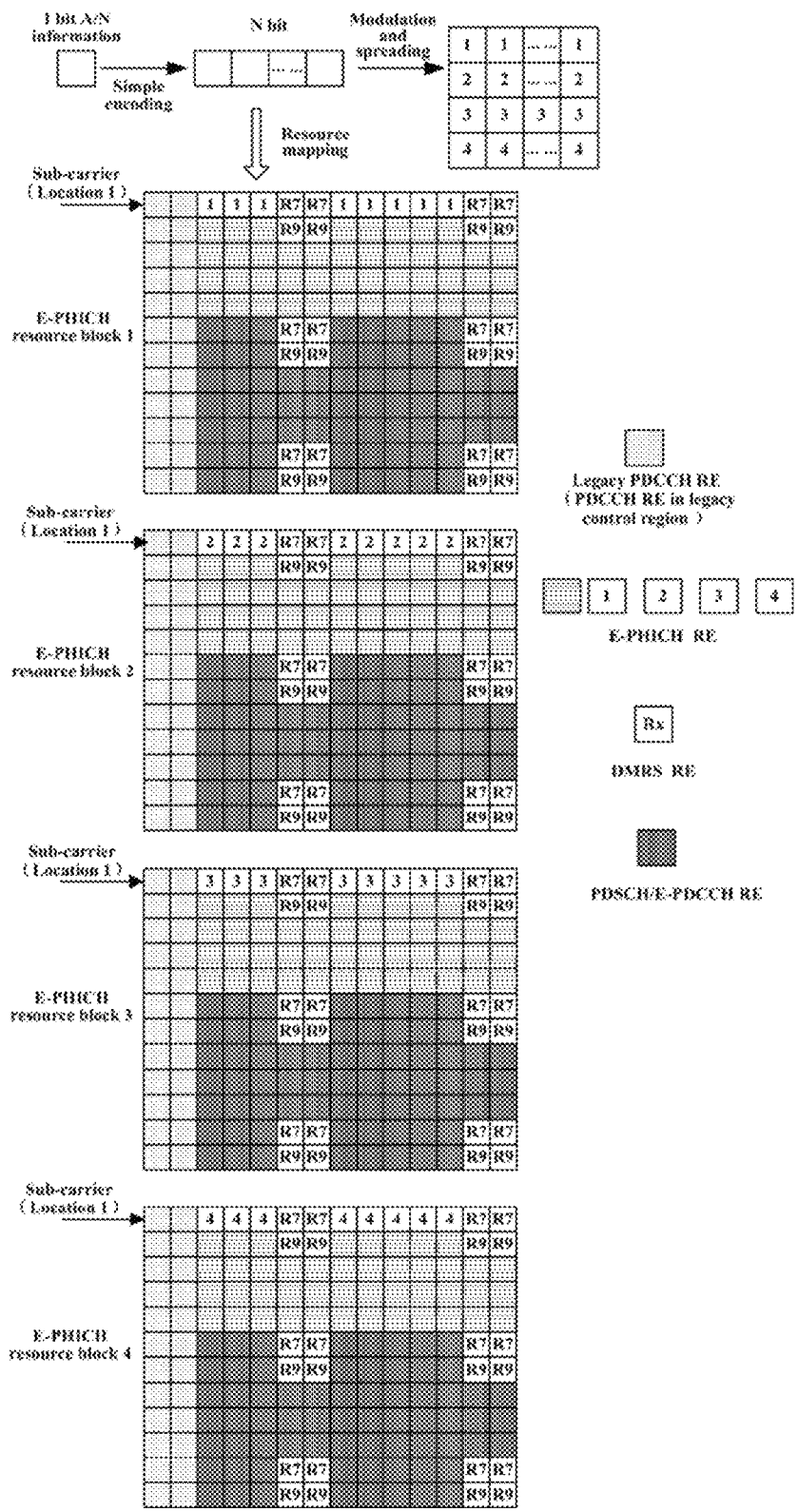
FIG. 5 to FIG. 11 are schematic diagrams of division into E-PHICH groups according to embodiments of the invention.

On the other hand, in the step 320, the base station may determine the E-PHICH groups for carrying the ACK/NACK feedback information in the following operations:

Firstly, each PRB pair included in the time-frequency resources occupied by the E-PHICH is determined;

Referring to FIG. 5, for example, given a normal CP, the time-frequency resources occupied by the E-PHICH include 4 PRB pairs (each of which corresponds to an E-PHICH resource block), and a PRB pair is represented as a 14×12 square with the ordinate representing the frequency domain in a unit of a sub-carrier and the abscissa representing the time domain in a unit of an OFDM symbol, wherein legacy Physical Downlink Control Channel (PDCCH) Resource Elements (REs) are carried in first two OFDM symbols.

Secondly division into the E-PHICH groups may be performed in one of the following three schemes:

In a first scheme, all of REs included in sub-carriers at a specified location among the respective PRB pairs belong to an E-PHICH group according to a scheduling condition of the user equipment.

Referring to FIG. 5, for example, all of REs included in sub-carriers at the location 1 among the respective PRB pairs belong to an E-PHICH group.

Figure 6:
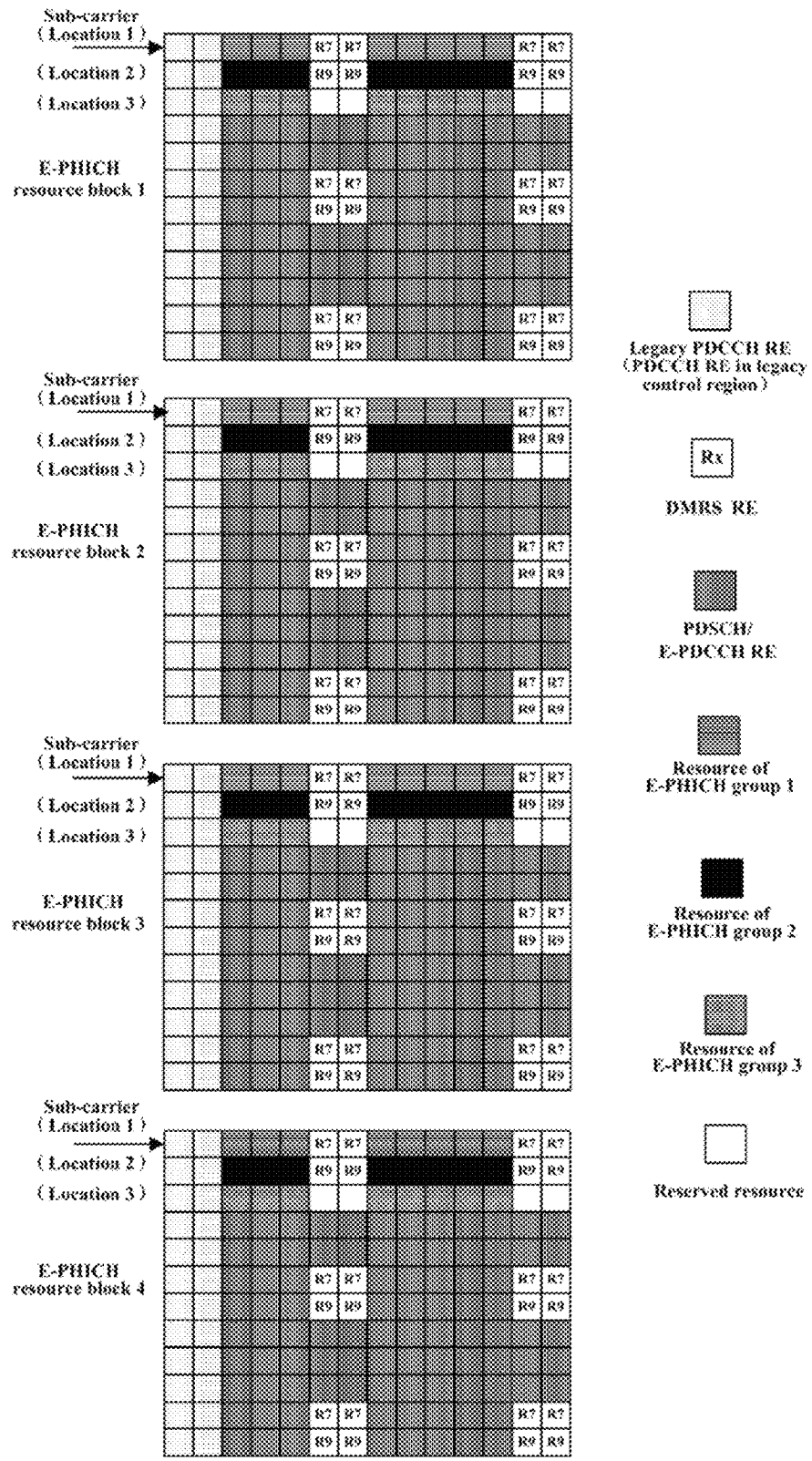

Furthermore a plurality of E-PHICH groups may be determined as above, and referring to FIG. 6, for example, all of REs included in the sub-carriers at the location 1 among the respective PRB pairs may belong to an E-PHICH group 1, all of REs included in sub-carriers at the location 2 among the respective PRB pairs may belong to an E-PHICH group 2, and all of REs included in sub-carriers at the location 3 among the respective PRB pairs may belong to an E-PHICH group 3, wherein a part of the REs in one of the E-PHICH groups may or may not be reserved as reserved resources by way of an example here but without any limitation thereto.

Preferably the REs for carrying legacy PDCCHs and reference signals need to be excluded from the respective E-PHICH groups above, wherein the so-called reference signals may be a CRS, a DMRS, a Channel State Information-Reference Signal (CSI-RS), etc.

Naturally all of REs included in sub-carriers at different locations among the respective PRB pairs may belong to an E-PHICH group, for example, all of REs included in a sub-carrier at the location 1 in the first PRB pair, all of REs included in a sub-carrier at the location 2 in the second PRB pair, all of REs included in a sub-carrier at the location 3 in the third PRB pair and all of REs included in a sub-carrier at the location 4 in the fourth PRB pair belong to an E-PHICH group, and this embodiment has been described with reference to FIG. 5 and FIG. 6 by way of an example.

In a second scheme, a specified part of REs in sub-carriers at a specified location among the respective PRB pairs may belong to an E-PHICH group according to a scheduling condition of the user equipment.

Figure 7:
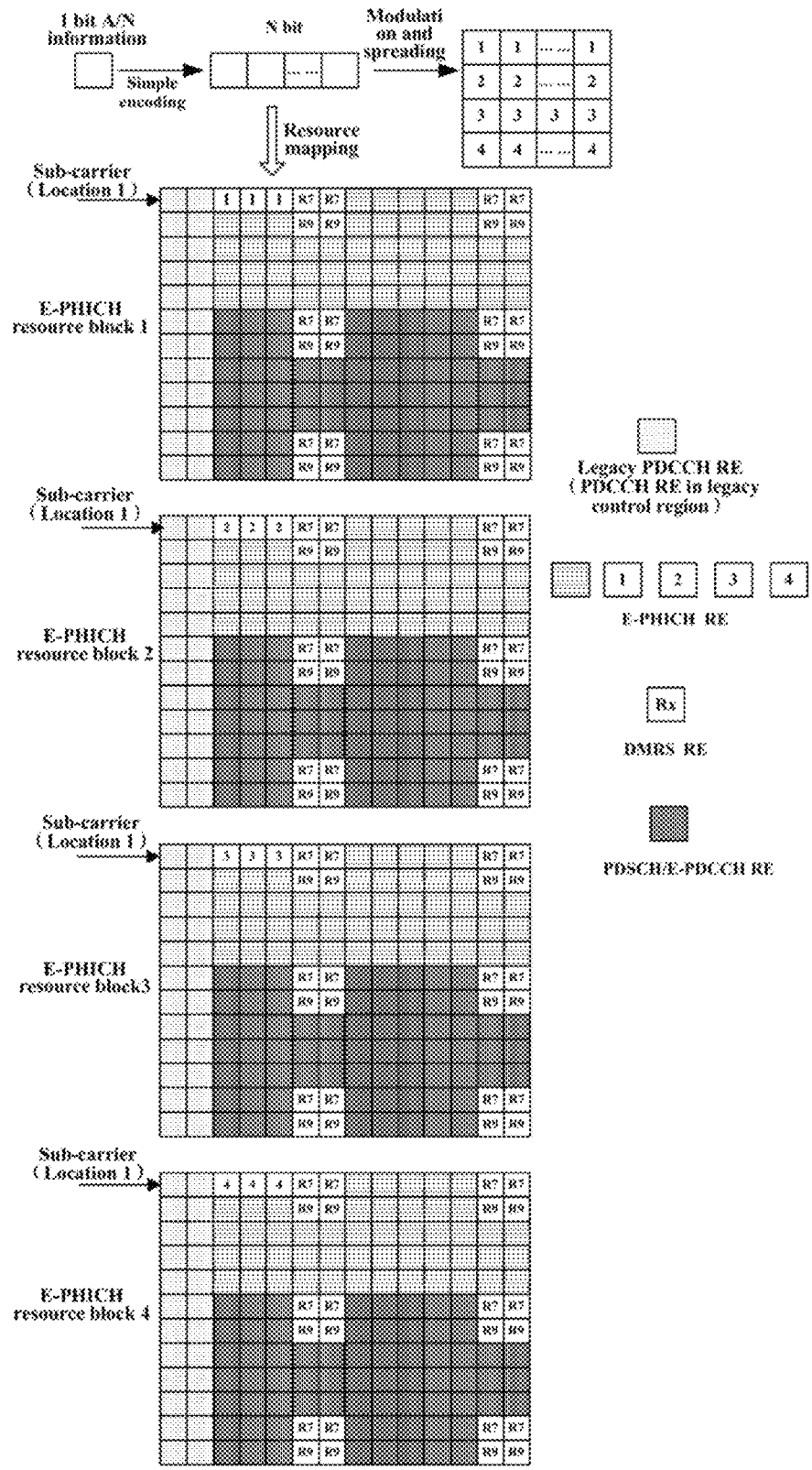

Referring to FIG. 7, for example, REs in the $3^{rd}$, $4^{th}$ and $5^{th}$ OFDM symbols included in sub-carriers at the location 1 among the respective PRB pairs belong to an E-PHICH group.

Figure 8:
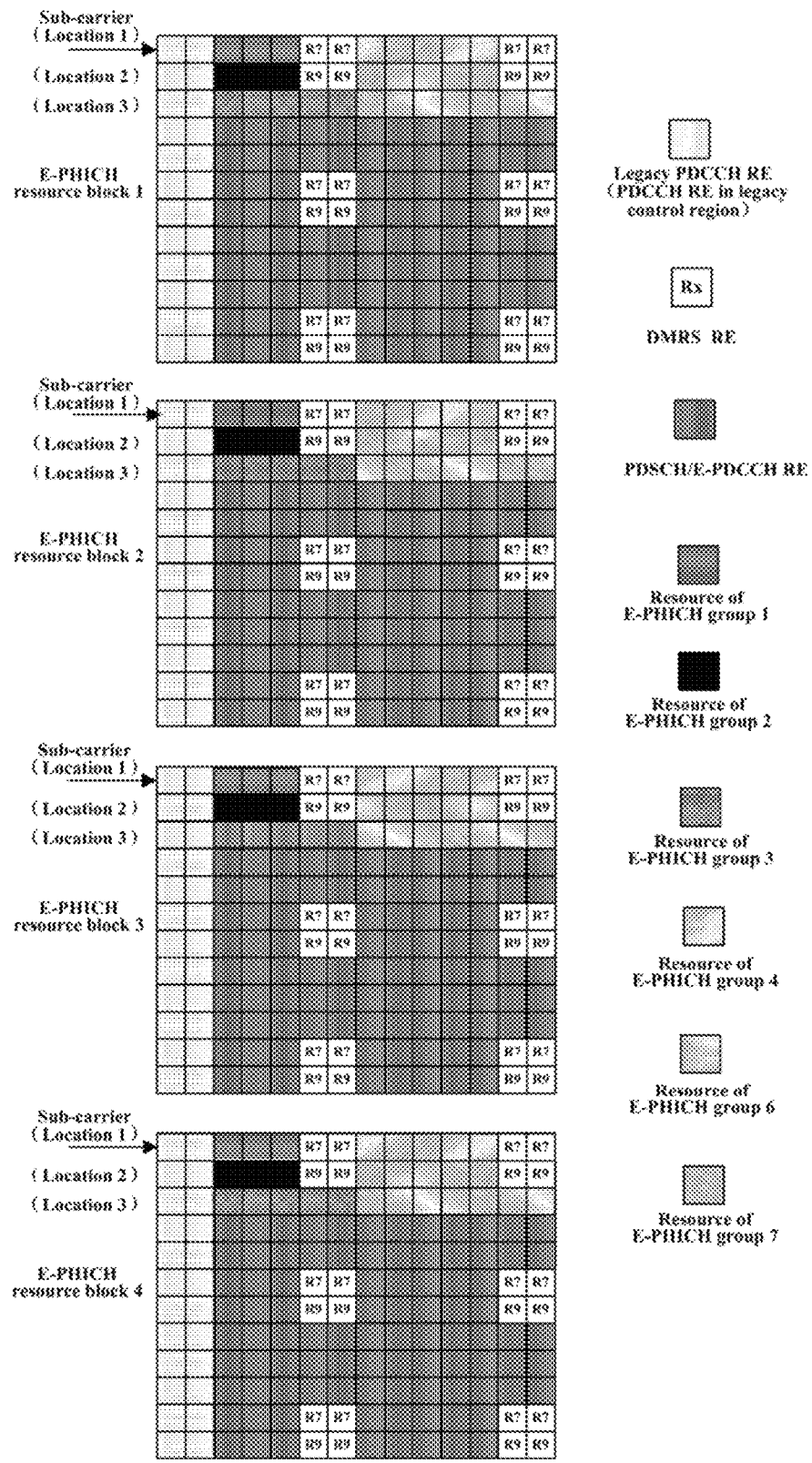

Furthermore, a plurality of E-PHICH groups may be determined as above, and referring to FIG. 8, for example, REs in the $3^{rd}$, $4^{th}$ and $5^{th}$ OFDM symbols included in the sub-carriers at the location 1 among the respective PRB pairs belong to an E-PHICH group 1, REs in the $3^{rd}$, $4^{th}$ and $5^{th}$ OFDM symbols included in sub-carriers at the location 2 among the respective PRB pairs belong to an E-PHICH group 2, REs in the $3^{rd}$, $4^{th}$ and $5^{th}$ OFDM symbols included in sub-carriers at the location 3 among the respective PRB pairs belong to an E-PHICH group 3, REs in the $8^{th}$, $9^{th}$, $10^{th}$, $11^{th}$ and $12^{th}$ OFDM symbols included in sub-carriers at the location 1 among the respective PRB pairs belong to an E-PHICH group 4, REs in the $8^{th}$, $9^{th}$, $10^{th}$, $11^{th}$ and $12^{th}$ OFDM symbols included in sub-carriers at the location 2 among the respective PRB pairs belong to an E-PHICH group 5, and REs in the $8^{th}$, $9^{th}$, $10^{th}$, $11^{th}$ and 12th OFDM symbols included in sub-carriers at the location 3 among the respective PRB pairs belong to an E-PHICH group 6.

Preferably the REs for carrying legacy PDCCHs and reference signals also need to be excluded from the respective E-PHICH groups above, wherein the so-called reference signals may be a CRS, a DMRS, a CSI-RS, etc.

Naturally, REs at specified locations included in sub-carriers at different locations among the respective PRB pairs may belong to an E-PHICH group. For example, REs in the $8^{th}$, $9^{th}$, $10^{th}$, $11^{th}$ and $12^{th}$ OFDM symbols included in a sub-carrier at the location 1 in the first PRB pair, REs in the $8^{th}$, $9^{th}$, $10^{th}$, $11^{th}$ and $12^{th}$ OFDM symbols included in a sub-carrier at the location 2 in the second PRB pair, REs in the $8^{th}$, $9^{th}$, $10^{th}$, $11^{th}$ and $12^{th}$ OFDM symbols included in a sub-carrier at the location 3 in the third PRB pair and REs in the $8^{th}$, $9^{th}$, $10^{th}$, $11^{th}$ and $12^{th}$ OFDM symbols included in a sub-carrier at the location 4 in the fourth PRB pair belong to an E-PHICH group, and this embodiment has been described with reference to FIG. 7 and FIG. 8 by way of an example.

In a third implementation, M REs in specified time domain and adjacent in frequency domain in each PRB pair, among the respective PRB pairs, belong to an E-PHICH group, wherein M represents a pre-configured parameter.

During the division of the E-PHICH groups, OFDM symbols adjacent to a DMRS in time domain may be occupied firstly. For example, if M=4, then referring to FIG. 9, REs in the $8^{th}$ OFDM symbols included in sub-carriers at the location 1, the location 2, the location 3 and the location 4 among the respective PRB pairs belong to an E-PHICH group.

Figure 10:
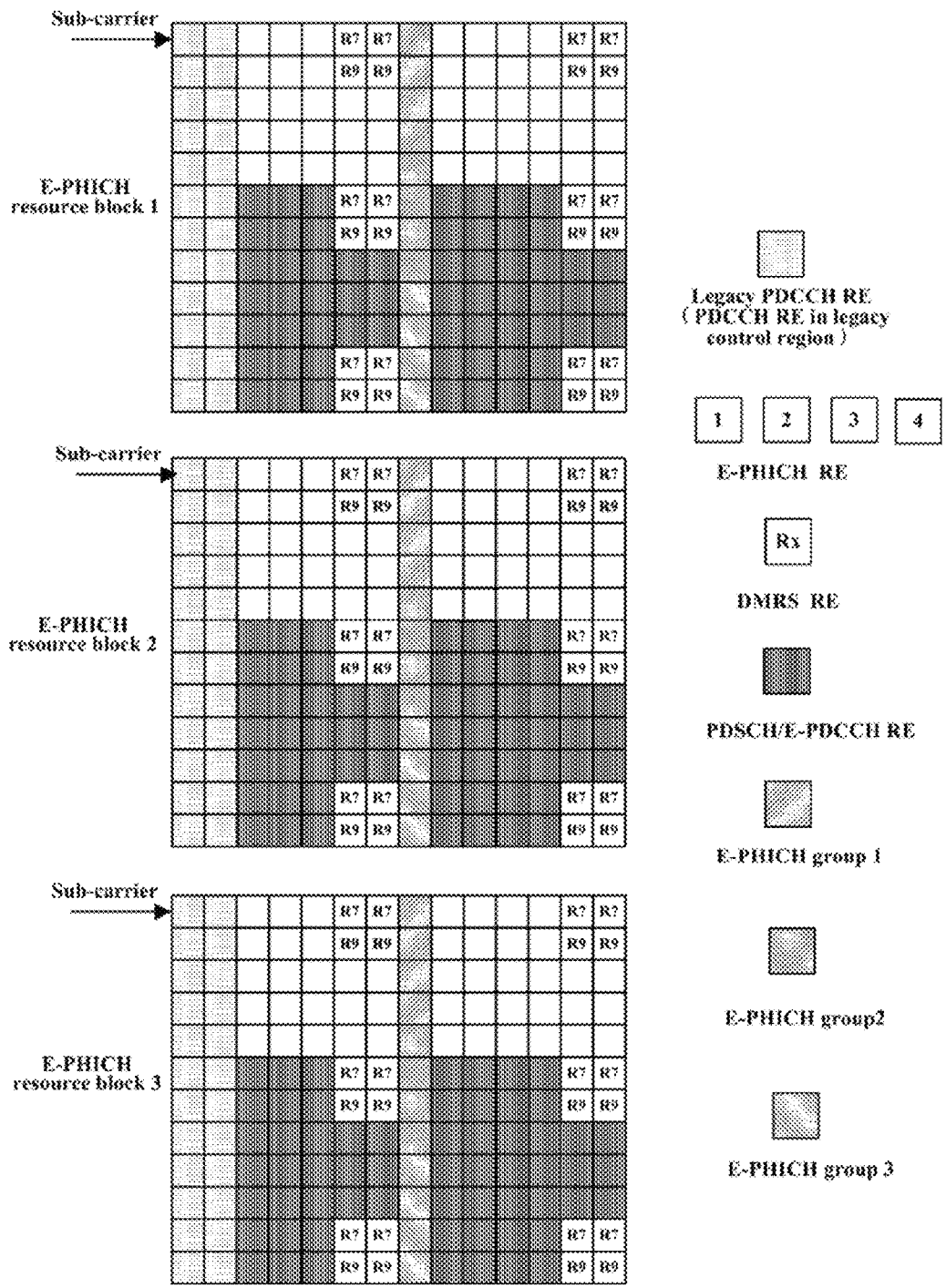

Furthermore a plurality of E-PHICH groups may be determined as above, and referring to FIG. 10, for example, REs in the $8^{th}$ OFDM symbols included in sub-carriers at the location 1, the location 2, the location 3 and the location 4 among the respective PRB pairs may belong to an E-PHICH group 1, REs in the $8^{th}$ OFDM symbols included in sub-carriers at the location 5, the location 6, the location 7 and the location 8 among the respective PRB pairs may belong to an E-PHICH group 2, and REs in the $8^{th}$ OFDM symbols included in sub-carriers at the location 9, the location 10, the location 11 and the location 12 among the respective PRB pairs may belong to an E-PHICH group 3.

Figure 11:
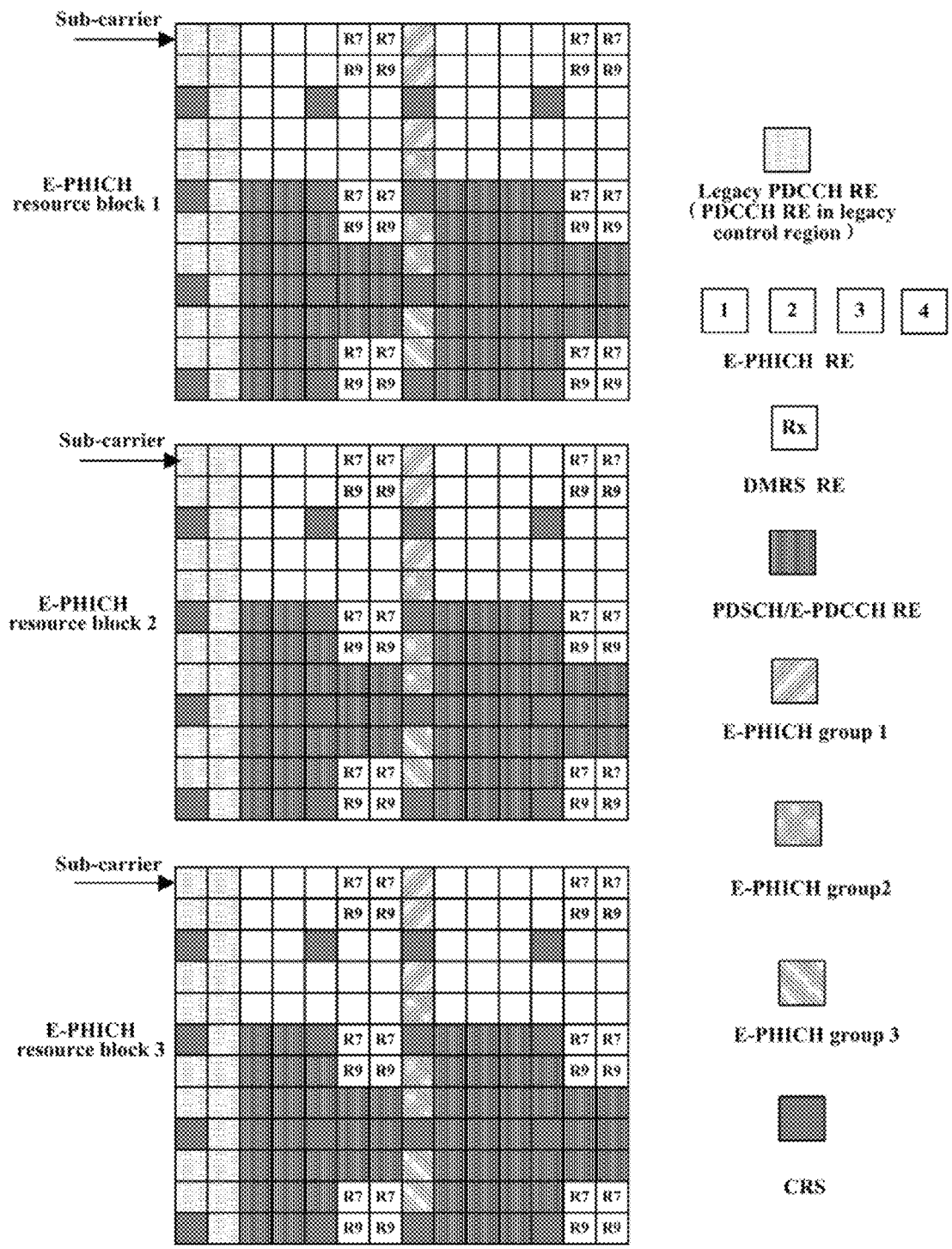

Preferably, the REs for carrying legacy PDCCHs and reference signals also need to be excluded from the respective E-PHICH groups above, wherein the so-called reference signals may be a CRS, a DMRS, a CSI-RS, etc. Referring to FIG. 11, for example, FIG. 11 illustrates division into E-PHICH groups in the case of two CRS antenna ports.

Step 330: The base station maps the ACK/NACK feedback information to be transmitted onto the corresponding E-PHICH groups and transmits the ACK/NACK feedback information to the user equipment.

Specifically:

A. The ACK/NACK feedback information to be transmitted is simply encoded.

For example, 1-bit ACK/NACK feedback information is simply encoded into N bits, possibly through repeated encoding or sequential encoding or in another encoding scheme, wherein N is a pre-configured parameter or may be a parameter as a result of rate matching according to available time-frequency resources.

Examples of the simply encoded ACK/NACK feedback information are as follows:

Example 1: ACK: 111 . . . , and NACK: 000 . . . .
Example 2: ACK: 1010 . . . , and NACK: 0101 . . . .

B. The simply encoded ACK/NACK feedback information is Binary Phase Shift Keying (BPSK) modulated into modulation symbols which are orthogonally spread bit by bit, preferably by a spreading factor of 4 and still using an orthogonal spreading sequence of a PHICH in the Rel-10.

C. The orthogonally spread modulation symbols are mapped respectively into the corresponding E-PHICH groups.

Referring to FIG. 5, for example, the orthogonally spread modulation symbols are grouped in rows, and the respective groups of modulation symbols are mapped respectively onto REs belonging to the same E-PHICH group among the respective PRB pairs, for example, the respective groups of modulation symbols are mapped respectively onto REs included in sub-carriers at the location 1 in the PRB pairs corresponding to the E-PHICH resource block 1, REs included in sub-carriers at the location 1 in the PRB pairs corresponding to the E-PHICH resource block 2, REs included in sub-carriers at the location 1 in the PRB pairs corresponding to the E-PHICH resource block 3 and REs included in sub-carriers at the location 1 in the PRB pairs corresponding to the E-PHICH resource block 4, and naturally these REs do not include REs for carrying legacy PDCCHs and reference signals.

In another example, referring to FIG. 7, the orthogonally spread modulation symbols are grouped in rows, and the respective groups of modulation symbols are mapped respectively onto REs belonging to the same E-PHICH group among the respective PRB pairs, for example, the respective groups of modulation symbols are mapped respectively onto REs in the $3^{rd}$, $4^{th}$ and $5^{th}$ OFDM symbols included in sub-carriers at the location 1 in the PRB pairs corresponding to the E-PHICH resource block 1, REs in the $3^{rd}$, $4^{th}$ and $5^{th}$ OFDM symbols included in sub-carriers at the location 1 in the PRB pairs corresponding to the E-PHICH resource block 2, REs in the $3^{rd}$, $4^{th}$ and $5^{th}$ OFDM symbols included in sub-carriers at the location 1 in the PRB pairs corresponding to the E-PHICH resource block 3 and REs in the $3^{rd}$, $4^{th}$ and $5^{th}$ OFDM symbols included in sub-carriers at the location 1 in the PRB pairs corresponding to the E-PHICH resource block 4, and naturally these REs do not include REs for carrying legacy PDCCHs and reference signals.

Figure 9:
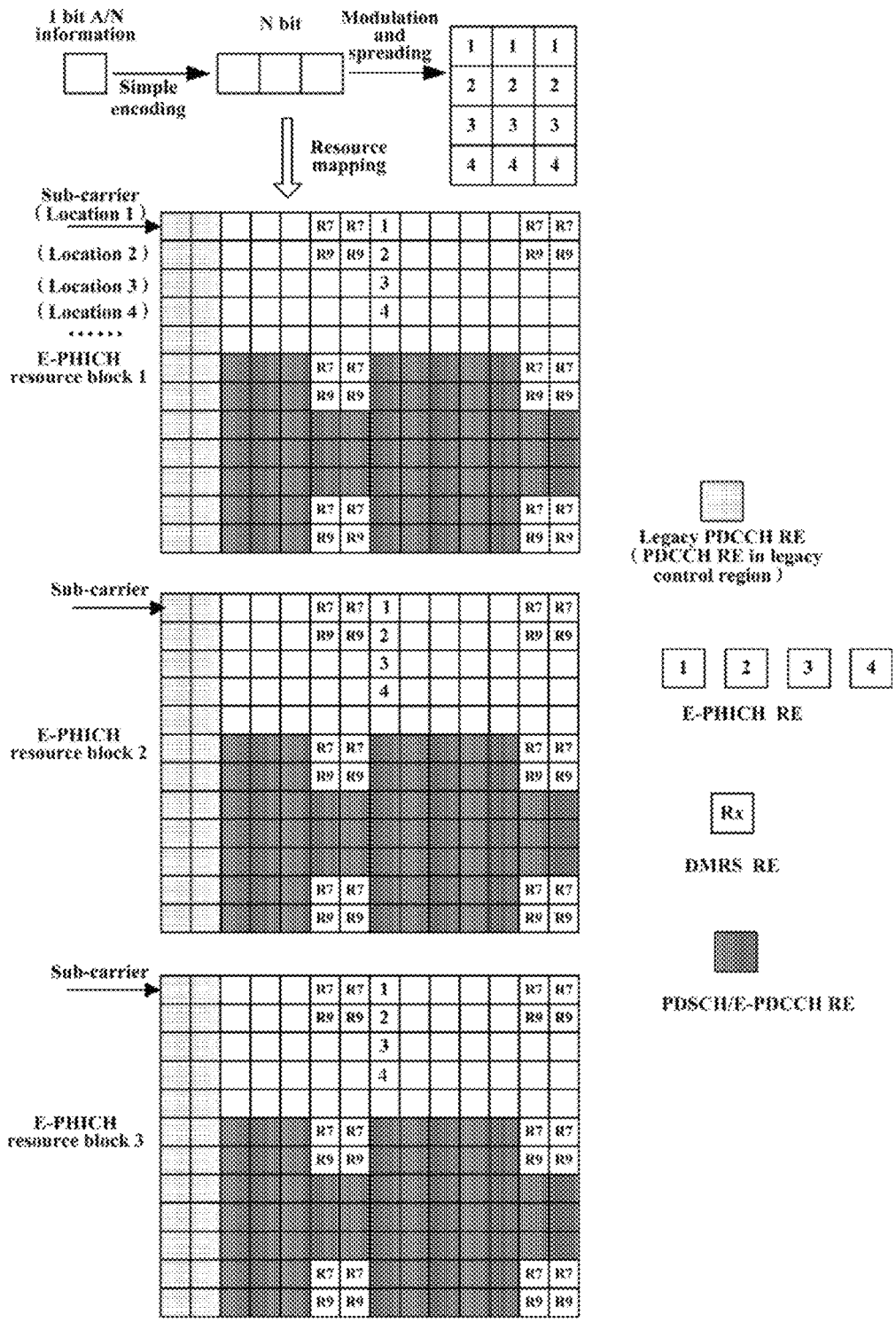

In another example, referring to FIG. 9, the orthogonally spread modulation symbols are grouped in columns, and the respective groups of modulation symbols are mapped respectively onto REs belonging to the same E-PHICH group among the respective PRB pairs, for example, the respective groups of modulation symbols are mapped respectively onto REs in the $8^{th}$ OFDM symbols included in sub-carriers at the location 1, the location 2, the location 3 and the location 4 in the PRB pairs corresponding to the E-PHICH resource block 1, REs in the $8^{th}$ OFDM symbols included in sub-carriers at the location 5, the location 6, the location 7 and the location 8 in the PRB pairs corresponding to the E-PHICH resource block 2 and REs in the $8^{th}$ OFDM symbols included in sub-carriers at the location 9, the location 10, the location 11 and the location 12 in the PRB pairs corresponding to the E-PHICH resource block 3, and naturally these REs do not include REs for carrying legacy PDCCHs and reference signals.

Based upon the foregoing embodiments, the base station can transmit the ACK/NACK feedback information in a transmission mode including a DMRS based single-port transmission mode and a DMRS based transmit diversity mode. Specific DMRS ports in use may be agreed on with the user equipment or may be notified to the user equipment via RRC signaling or a system broadcast message.

In the foregoing embodiments, the REs included in any one of the E-PHICH groups may carry transmission of 8 or 4 E-PHICHs, wherein different E-PHICHs may have the resources of the same E-PHICH group multiplexed through code division, and transmission of the same E-PHICH may be divided into a plurality of parts, different parts among which may occupy different time-frequency resources for transmission to achieve a diversity gain. The respective E-PHICHs are distinguished from each other by orthogonal sequences, so in the step 320, the base station further needs to determine orthogonal sequences for spreading according to the lowest PRB serial number and the cyclic shift of the uplink DMRS indicated in the PUSCH transmission grant and to notify the user equipment of the orthogonal sequences, and the user equipment determines the E-PHICH for receiving the ACK/NACK feedback information in the corresponding E-PHICH groups according to the obtained orthogonal sequences, particularly as in Formula 1 and Formula 2. This embodiment is focused on determination of the E-PHICH groups, so a description of details concerning the orthogonal sequences will be omitted here.

Figure 12:
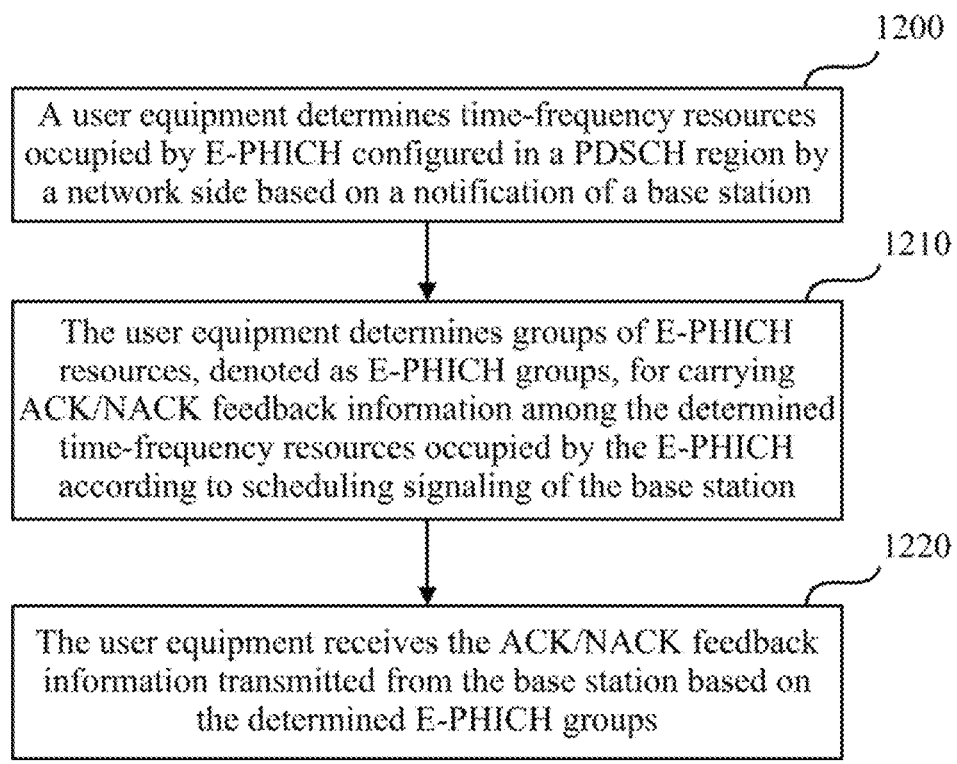
FIG. 12 is a flow chart of a user equipment receiving ACK/NACK feedback information based on E-PHICH according to an embodiment of the invention.

In correspondence to the foregoing embodiments, referring to FIG. 12, a detailed flow in which a user equipment receives ACK/NACK feedback information based on E-PHICH according to an embodiment of the present invention is as follows:

Step 1200: A user equipment determines time-frequency resources occupied by E-PHICH configured in a PDSCH region by the network side based on a notification of a base station.

Like the step 310, in the step 1200, the user equipment may determine specific locations of PRB pairs occupied by the E-PHICH, or determine a starting location and the number of PRB pairs occupied by the E-PHICH, according to RRC signaling or a system broadcast message sent from the base station; or may obtain an E-PHICH resource configuration parameter according to RRC signaling or a system broadcast message sent from the base station and occupy a part of time-frequency resources in E-PDCCH according to the E-PHICH resource configuration parameter.

Step 1210: The user equipment determines groups of E-PHICH resources, denoted as E-PHICH groups, for carrying ACK/NACK feedback information among the determined time-frequency resources occupied by the E-PHICH according to scheduling signaling of the base station.

In the step 1210, the user equipment may determine the E-PHICH resources for carrying the ACK/NACK feedback information among the time-frequency resources occupied by the E-PHICH according to a lowest PRB serial number and a cyclic shift of an uplink DMRS indicated in the scheduling signaling, and reference can be made to the Rel-10 for related operations thereof, so a repeated description thereof will be omitted here.

On the other hand, the user equipment may perform the following operations in the step 1210:

Firstly each PRB pair included in the time-frequency resources occupied by the E-PHICH is determined; and Secondly, according to the scheduling signaling of the base station, all of Resource Elements (REs) included in sub-carriers at a specified location among the respective PRB pairs belong to an enhanced PHICH group; or a specified part of REs in sub-carriers at a specified location among the respective PRB pairs belong to an enhanced PHICH group; or M REs in specified time domain and adjacent in frequency domain in each PRB pair, among the respective PRB pairs, belong to an enhanced PHICH group. Preferably, when the respective E-PHICH groups are determined, REs for carrying legacy PDCCHs and reference signals are excluded from the respective REs belong to the same E-PHICH group; and reference can be made to FIG. 5. FIG. 7 and FIG. 9 for details thereof, so a repeated description thereof will be omitted here.

Step 1220: The user equipment receives the ACK/NACK feedback information transmitted from the base station based on the determined E-PHICH groups.

Specifically:

Firstly, orthogonally spread modulation symbols, for carrying the ACK/NACK feedback information, in the determined E-PHICH groups are de-mapped;

For example, orthogonally spread modulation symbols, for carrying the ACK/NACK feedback information, in the REs belonging to the same E-PHICH group among the respective PRB pairs are combined, wherein referring to FIG. 9 to FIG. 10, the above orthogonally spread modulation symbols for carrying the ACK/NACK feedback information may be combined in rows or columns.

Secondly, the orthogonally spread modulation symbols for carrying the ACK/NACK feedback information are de-spread orthogonally and demodulated into simply encoded ACK/NACK feedback information; and Finally, the simply encoded ACK/NACK feedback information is decoded into the ACK/NACK feedback information.

In a practical application, the REs included in any one of the E-PHICH groups may carry transmission of 8 or 4 E-PHICHs, wherein different E-PHICHs may have the resources of the same E-PHICH group multiplexed through code division, and transmission of the same E-PHICH may be divided into a plurality of parts, different parts among which may occupy different time-frequency resources for transmission to achieve a diversity gain. The respective E-PHICHs are distinguished from each other by orthogonal sequences, so in the step 1220, the user equipment further needs to determine orthogonal sequences used by the base station according to the lowest PRB serial number and the cyclic shift of the uplink DMRS indicated in the scheduling signaling and determines the E-PHICH for receiving the ACK/NACK feedback information in the corresponding E-PHICH group according to the determined orthogonal sequences, particularly as in Formula 1 and Formula 2. This embodiment is focused on determination of the E-PHICH groups, so a description of details concerning the orthogonal sequences will be omitted here.

On the other hand, in this embodiment, the user equipment may receive the ACK/NACK feedback information in a transmission mode including a DMRS based single-port transmission mode and a DMRS based transmit diversity mode. Specific DMRS ports in use may be agreed on with the base station or may be determined according to RRC signaling or a system broadcast message sent from the base station.

Figure 13:
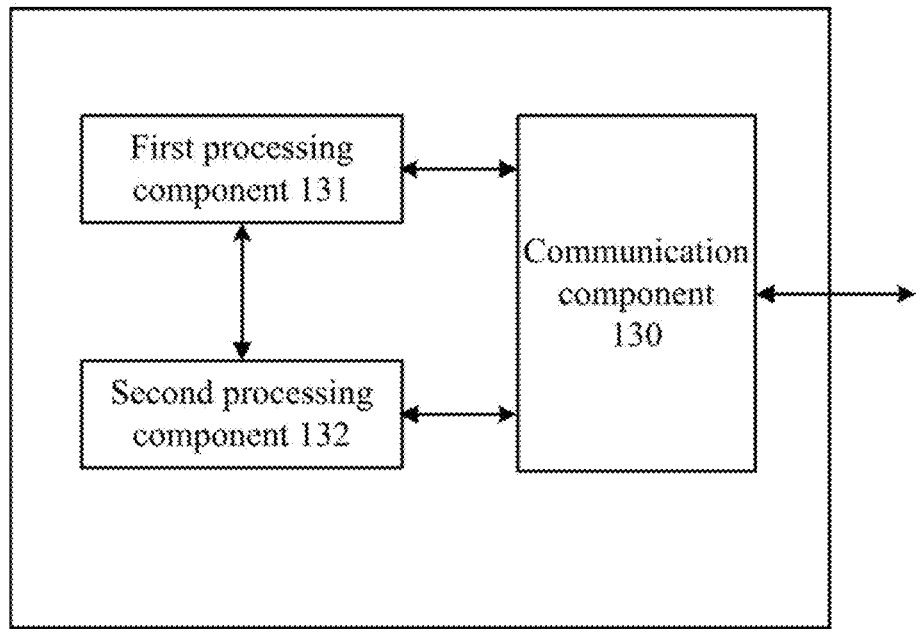
FIG. 13 is a schematic functional structural diagram of a base station according to an embodiment of the invention.
Figure 14:
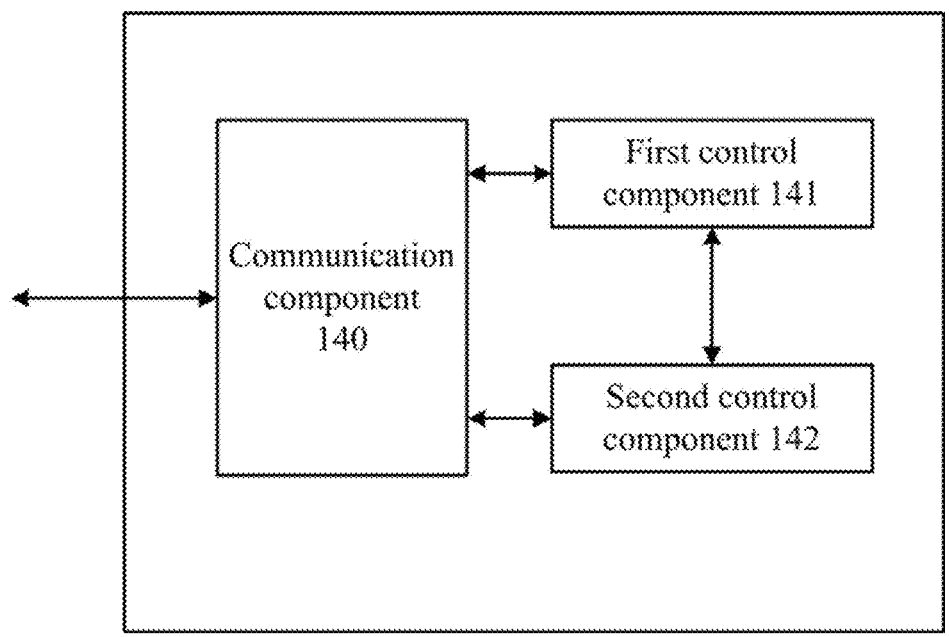
FIG. 14 is a schematic functional structural diagram of a user equipment according to an embodiment of the invention.

In summary, referring to FIG. 13 and FIG. 14, a device (e.g., a base station) for feedback information transmission based on an enhanced Physical Hybrid Automatic Repeat Request (HARQ) Indicator Channel (PHICH) includes a communication component 130, a first processing component 131 and a second processing component 132.

The first processing component 131 is configured to determine time-frequency resources occupied by an enhanced PHICH configured in a PDSCH region by the network side and to notify a user equipment of the determined time-frequency resources occupied by the E-PHICH;

The second processing component 132 is configured to determine E-PHICH groups for carrying ACK/NACK feedback information among the time-frequency resources occupied by the E-PHICH according to a scheduling condition of the user equipment; and The communication component 130 is configured to map the ACK/NACK feedback information to be transmitted onto the E-PHICH groups and to transmit the ACK/NACK feedback information to the user equipment.

Furthermore the first processing component 131 configured to notify the user equipment of the determined time-frequency resources occupied by the E-PHICH is further configured to:

notify the user equipment of specific locations of Physical Resource Block (PRB) pairs occupied by the E-PHICH, or to notify the user equipment of a starting location and the number of PRB pairs occupied by the E-PHICH, via Radio Resource Control (RRC) signaling or a system broadcast message through the communication component 130;

or notify the user equipment of an E-PHICH resource configuration parameter via RRC signaling or a system broadcast message through the communication component 130 to instruct the user equipment to occupy a part of time-frequency resources in Enhanced-Physical Downlink Control Channel (E-PDCCH) according to the E-PHICH resource configuration parameter.

Furthermore, the second processing component 132 configured to determine the E-PHICH groups for carrying the ACK/NACK feedback information among the time-frequency resources occupied by the E-PHICH according to the scheduling condition of the user equipment is further configured to:

determine each Physical Resource Block (PRB) pair included in the time-frequency resources occupied by the E-PHICH; and attribute all of Resource Elements (REs) included in sub-carriers at a specified location among the respective PRB pairs to an enhanced PHICH group; or to attribute a specified part of REs in sub-carriers at a specified location among the respective PRB pairs to an enhanced PHICH group; or to attribute M REs in specified time domain and adjacent in frequency domain in each PRB pair, among the respective PRB pairs, to an enhanced PHICH group, according to the scheduling condition of the user equipment, wherein M represents a pre-configured parameter.

Furthermore, when determining the respective E-PHICH groups, the second processing component 132 excludes REs for carrying legacy control information and reference signals from the respective REs belonging to the same E-PHICH group.

Furthermore the communication component 130 configured to map the ACK/NACK information to be transmitted onto the E-PHICH groups is further configured to:

simply encode the ACK/NACK information to be transmitted:

perform binary phase modulation on the simply encoded ACK/NACK information and orthogonally spread obtained modulation symbols; and map the orthogonally spread modulation symbols respectively into the E-PHICH groups.

Furthermore the communication component 130 configured to map the orthogonally spread modulation symbols respectively into the E-PHICH groups is further configured to:

group the orthogonally spread modulation symbols in rows or columns and map the respective groups of modulation symbols respectively onto the REs, belonging to the same E-PHICH group, among the respective PRB pairs.

Furthermore, the communication component 130 is configured to transmit the ACK/NACK feedback information in a DMRS based single-port transmission mode or a DMRS based transmit diversity mode.

A device (e.g., a user equipment) for feedback information transmission based on an enhanced Physical Hybrid Automatic Repeat Request (HARQ) Indicator Channel (PHICH) includes a communication component 140, a first control component 141 and a second control component 142.

The first control component 141 is configured to determine time-frequency resources occupied by E-PHICH configured in a PDSCH region by a network side based on a notification of a base station;

The second control component 142 is configured to determine E-PHICH groups for carrying ACK/NACK feedback information among the time-frequency resources occupied by the E-PHICH according to scheduling signaling of the base station; and The communication component 140 is configured to receive the ACK/NACK feedback information transmitted from the base station based on the determined E-PHICH groups.

Furthermore, the first control component 141 configured to determine time-frequency resources occupied by E-PHICH configured in the PDSCH region by the network side based on the notification of the base station is further configured to:

determine specific locations of Physical Resource Block (PRB) pairs occupied by the E-PHICH, or determine a starting location and the number of PRB pairs occupied by the E-PHICH, according to Radio Resource Control (RRC) signaling or a system broadcast message sent from the base station through the communication component 140;

or obtain an E-PHICH resource configuration parameter according to RRC signaling or a system broadcast message sent from the base station through the communication component 140 and occupy a part of time-frequency resources in Enhanced-Physical Downlink Control Channel (E-PDCCH) according to the E-PHICH resource configuration parameter.

Furthermore, the second control component 142 configured to determine the E-PHICH groups for carrying the ACK/NACK feedback information among the time-frequency resources occupied by the E-PHICH according to the scheduling signaling of the base station is further configured to:

determine each Physical Resource Block (PRB) pair included in the time-frequency resources occupied by the E-PHICH; and attribute all of Resource Elements (REs) included in sub-carriers at a specified location among the respective PRB pairs to an enhanced PHICH group; or to attribute a specified part of REs in sub-carriers at a specified location among the respective PRB pairs to an enhanced PHICH group; or to attribute M REs in specified time domain and adjacent in frequency domain in each PRB pair, among the respective PRB pairs, to an enhanced PHICH group, according to the scheduling signaling of the base station, wherein M represents a pre-configured parameter.

Furthermore, when determining the respective E-PHICH groups, the second control component 142 excludes REs for carrying legacy control information and reference signals from the respective REs belonging to the same E-PHICH group.

Furthermore the communication component 140 configured to receive the ACK/NACK feedback information transmitted from the base station based on the determined E-PHICH groups is further configured to:

de-map orthogonally spread modulation symbols, for carrying the ACK/NACK feedback information, in the E-PHICH groups;

de-spread orthogonally and demodulate the orthogonally spread modulation symbols for carrying the ACK/NACK feedback information into simply encoded ACK/NACK feedback information; and decode the simply encoded ACK/NACK feedback information into the ACK/NACK feedback information.

Furthermore, the orthogonally spread modulation symbols, for carrying the ACK/NACK feedback information, in the E-PHICH groups are de-mapped as follows:

The orthogonally spread modulation symbols, for carrying the ACK/NACK feedback information, in the REs belonging to the same E-PHICH group among the respective PRB pairs are combined, wherein the orthogonally spread modulation symbols for carrying the ACK/NACK feedback information are combined in rows or columns.

Furthermore, the communication component 140 is configured to receive the ACK/NACK feedback information in a DMRS based single-port transmission mode or a DMRS based transmit diversity mode.

In summary, an embodiment of the present invention proposes a novel method for E-PHICH transmission based upon FDM, that is. ACK/NACK feedback information is carried over E-PHICH resources configured in a PDSCH region, so that on one hand, the issue of unavailable transmission of PHICHs in some scenarios, e.g., in an ABS sub-frame of eICIC and an extended carrier to be possibly defined subsequently, can be addressed; and on the other hand, the overhead of signaling can be saved and the utilization ratio of resources can be improved, for example, retransmission of a PUSCH scheduled by the system in the DCI format 0 is avoided, to achieve the effects of improving a capacity of PHICHs and addressing a legacy PHICH resource confliction.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for feedback information transmission based on an enhanced Physical Hybrid Automatic Repeat Request, HARQ, Indicator Channel, PHICH, comprising:

determining time-frequency resources occupied by enhanced PHICHs configured in a Physical Downlink Shared Channel, PDSCH, region by a network side;

notifying a user equipment of the determined time-frequency resources occupied by enhanced PHICHs;

determining groups of enhanced PHICH resources for carrying Acknowledgement/Non-Acknowledgement, ACK/NACK, feedback information among the time-frequency resources occupied by the enhanced PHICHs according to a scheduling condition of the user equipment; and mapping the ACK/NACK feedback information to be transmitted onto the groups of enhanced PHICH resources and transmitting the ACK/NACK feedback information to the user equipment;

wherein determining the groups of enhanced PHICH resources for carrying the ACK/NACK feedback information among the time-frequency resources occupied by the enhanced PHICHs according to the scheduling condition of the user equipment comprises:

determining each Physical Resource Block, PRB, pair included in the time-frequency resources occupied by the enhanced PHICH; and attributing all of Resource Elements, REs, included in sub-carriers at a specified location among the respective PRB pairs to a group of enhanced PHICH resources; or attributing a specified part of REs in sub-carriers at a specified location among the respective PRB pairs to a group of enhanced PHICH resources; or attributing M REs in specified time domain and adjacent in frequency domain in each PRB pair, among the respective PRB pairs, to a group of enhanced PHICH resources, according to the scheduling condition of the user equipment, wherein M represents a pre-configured parameter;

wherein mapping the ACK/NACK information to be transmitted onto the groups of E-PHICH resources comprises:

simply encoding the ACK/NACK information to be transmitted;

performing binary phase modulation on the simply encoded ACK/NACK information and orthogonally spreading obtained modulation symbols; and mapping the orthogonally spread modulation symbols respectively into the groups of enhanced PHICH resources;

wherein mapping the orthogonally spread modulation symbols respectively into the groups of enhanced PHICH resources comprises:

grouping the orthogonally spread modulation symbols in rows or columns and mapping the respective groups of modulation symbols respectively onto the REs belonging to the same group of enhanced PHICH resources among the respective PRB pairs.

2. The method according to claim 1, wherein the ACK/NACK feedback information is transmitted in a De-Modulation Reference Symbol, DMRS, based single-port transmission mode or a DMRS based transmit diversity mode.

3. A method for feedback information transmission based on an enhanced Physical Hybrid Automatic Repeat Request, HARQ, Indicator Channel, PHICH, comprising:

determining time-frequency resources occupied by enhanced PHICHs configured in a Physical Downlink Shared Channel, PDSCH, region by a network side based on a notification of a base station;

determining groups of enhanced PHICH resources for carrying Acknowledgement/Non-Acknowledgement, ACK/NACK, feedback information among the determined time-frequency resources occupied by the enhanced PHICHs according to scheduling signaling of the base station; and receiving the ACK/NACK feedback information transmitted from the base station based on the determined groups of enhanced PHICH resources;

wherein determining the groups of enhanced PHICH resources for carrying the ACK/NACK feedback information among the time-frequency resources occupied by the enhanced PHICHs according to the scheduling signaling of the base station comprises:

determining each Physical Resource Block, PRB, pair included in the time-frequency resources occupied by the enhanced PHICH; and attributing all of Resource Elements, REs, included in sub-carriers at a specified location among the respective PRB pairs to a group of enhanced PHICH resources; or attributing a specified part of REs in sub-carriers at a specified location among the respective PRB pairs to a group of enhanced PHICH resources; or attributing M REs in specified time domain and adjacent in frequency domain in each PRB pair, among the respective PRB pairs, to a group of enhanced PHICH resources, according to the scheduling signaling of the base station, wherein M represents a pre-configured parameter;

wherein receiving the ACK/NACK feedback information transmitted from the base station based on the determined groups of enhanced PHICH resources comprises:

de-mapping orthogonally spread modulation symbols for carrying the ACK/NACK feedback information in the groups of enhanced PHICH resources;

de-spreading orthogonally and demodulating the orthogonally spread modulation symbols for carrying the ACK/NACK feedback information into simply encoded ACK/NACK feedback information; and decoding the simply encoded ACK/NACK feedback information into the ACK/NACK feedback information;

wherein de-mapping the orthogonally spread modulation symbols for carrying the ACK/NACK feedback information in the groups of enhanced PHICH resources comprises:

combining the orthogonally spread modulation symbols, for carrying the ACK/NACK feedback information, in the REs belonging to the same group of enhanced PHICH resources among the respective PRB pairs, wherein the orthogonally spread modulation symbols for carrying the ACK/NACK feedback information are combined in rows or columns.

4. The method according to claim 3, wherein the ACK/NACK feedback information is received in a De-Modulation Reference Symbol, DMRS, based single-port transmission mode or a DMRS based transmit diversity mode.

5. A device for feedback information transmission based on an enhanced Physical Hybrid Automatic Repeat Request, HARQ, Indicator Channel, PHICH, comprising:

a first processing component configured to determine time-frequency resources occupied by enhanced PHICHs configured in a Physical Downlink Shared Channel, PDSCH, region by a network side and to notify a user equipment of the determined time-frequency resources occupied by enhanced PHICHs;

a second processing component configured to determine groups of enhanced PHICH resources for carrying Acknowledgement/Non-Acknowledgement, ACK/NACK, feedback information among the time-frequency resources occupied by the enhanced PHICHs according to a scheduling condition of the user equipment; and a communication component configured to map the ACK/NACK feedback information to be transmitted onto the groups of enhanced PHICH resources and to transmit the ACK/NACK feedback information to the user equipment;

wherein the second processing component configured to determine the groups of enhanced PHICH resources for carrying the ACK/NACK feedback information among the time-frequency resources occupied by the enhanced PHICHs according to the scheduling condition of the user equipment is further configured:

to determine each Physical Resource Block, PRB, pair included in the time-frequency resources occupied by the enhanced PHICH; and to attribute all of Resource Elements, REs, included in sub-carriers at a specified location among the respective PRB pairs to a group of enhanced PHICH resources; or to attribute a specified part of REs in sub-carriers at a specified location among the respective PRB pairs to a group of enhanced PHICH resources; or to attribute M REs in specified time domain and adjacent in frequency domain in each PRB pair, among the respective PRB pairs, to a group of enhanced PHICH resources, according to the scheduling condition of the user equipment, wherein M represents a pre-configured parameter;

wherein the communication component configured to map the ACK/NACK information to be transmitted onto the groups of enhanced PHICH resources is further configured:

to simply encode the ACK/NACK information to be transmitted;

to perform binary phase modulation on the simply encoded ACK/NACK information and to orthogonally spread obtained modulation symbols; and to map the orthogonally spread modulation symbols respectively into the groups of enhanced PHICH resources;

wherein the communication component configured to map the orthogonally spread modulation symbols respectively into the groups of enhanced PHICH resources is further configured:

to group the orthogonally spread modulation symbols in rows or columns and to map the respective groups of modulation symbols respectively onto the REs belonging to the same group of enhanced PHICH resources among the respective PRB pairs.

6. The device according to claim 5, wherein the communication component is configured to transmit the ACK/NACK feedback information in a De-Modulation Reference Symbol, DMRS, based single-port transmission mode or a DMRS based transmit diversity mode.

7. A device for feedback information transmission based on an enhanced Physical Hybrid Automatic Repeat Request, HARQ, Indicator Channel, PHICH, comprising:

a first control component configured to determine time-frequency resources occupied by enhanced PHICHs configured in a Physical Downlink Shared Channel, PDSCH, region by a network side based on a notification of a base station;

a second control component configured to determine groups of enhanced PHICH resources for carrying Acknowledgement/Non-Acknowledgement, ACK/NACK, feedback information among the determined time-frequency resources occupied by the enhanced PHICHs according to scheduling signaling of the base station; and a communication component configured to receive the ACK/NACK feedback information transmitted from the base station based on the determined groups of enhanced PHICH resources;

wherein the second control component configured to determine the groups of enhanced PHICH resources for carrying the ACK/NACK feedback information among the time-frequency resources occupied by the enhanced PHICHs according to the scheduling signaling of the base station is further configured:

to determine each Physical Resource Block, PRB, pair included in the time-frequency resources occupied by the enhanced PHICH; and to attribute all of Resource Elements, REs, included in sub-carriers at a specified location among the respective PRB pairs to a group of enhanced PHICH resources; or to attribute a specified part of REs in sub-carriers at a specified location among the respective PRB pairs to a group of enhanced PHICH resources; or to attribute M REs in specified time domain and adjacent in frequency domain in each PRB pair, among the respective PRB pairs, to a group of enhanced PHICH resources, according to the scheduling signaling of the base station, wherein M represents a pre-configured parameter;

wherein the communication component configured to receive the ACK/NACK feedback information transmitted from the base station based on the determined groups of enhanced PHICH resources is further configured:

to de-map orthogonally spread modulation symbols for carrying the ACK/NACK feedback information in the groups of enhanced PHICH resources;

to de-spread orthogonally and demodulate the orthogonally spread modulation symbols for carrying the ACK/NACK feedback information into simply encoded ACK/NACK feedback information; and to decode the simply encoded ACK/NACK feedback information into the ACK/NACK feedback information;

wherein de-mapping the orthogonally spread modulation symbols for carrying the ACK/NACK feedback information in the groups of enhanced PHICH resources comprises:

combining the orthogonally spread modulation symbols for carrying the ACK/NACK feedback information in the REs belonging to the same group of enhanced PHICH resources among the respective PRB pairs, wherein the orthogonally spread modulation symbols for carrying the ACK/NACK feedback information are combined in rows or columns.

8. The device according to claim 7, wherein the communication component is configured to receive the ACK/NACK feedback information in a De-Modulation Reference Symbol, DMRS, based single-port transmission mode or a DMRS based transmit diversity mode.

* * * * *